D. F. COMSTOCK.
LIGHT PROJECTION.
APPLICATION FILED APR. 21, 1916.
1,377,184.
Patented May 10, 1921.
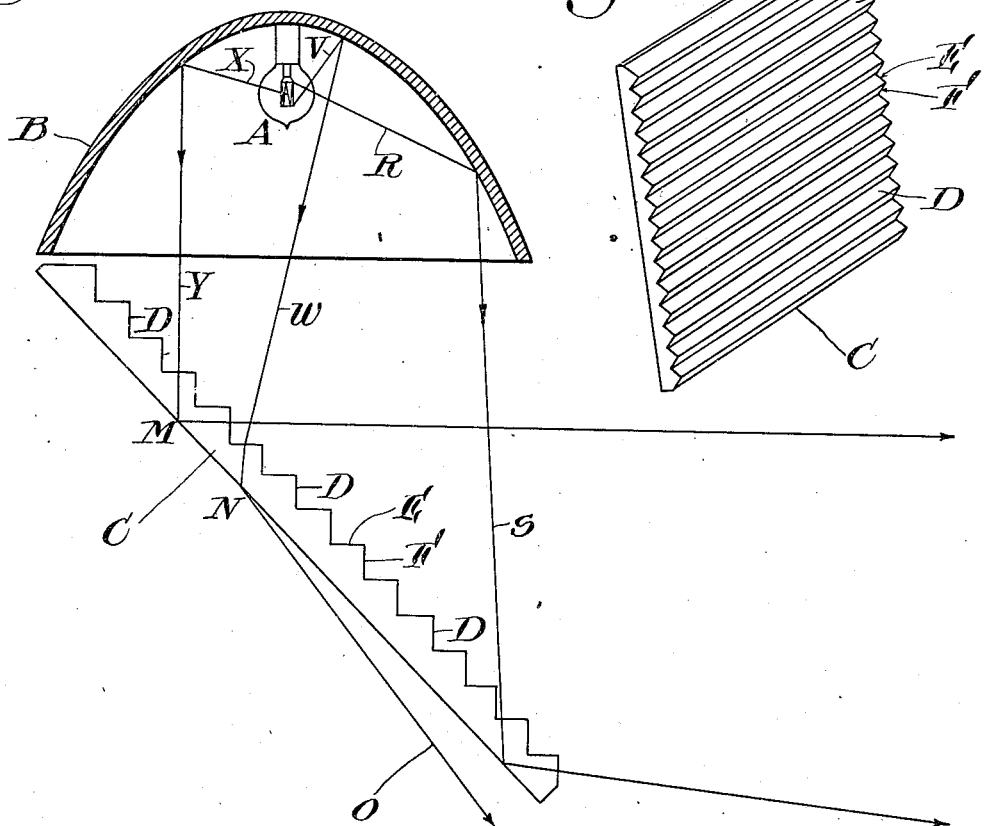
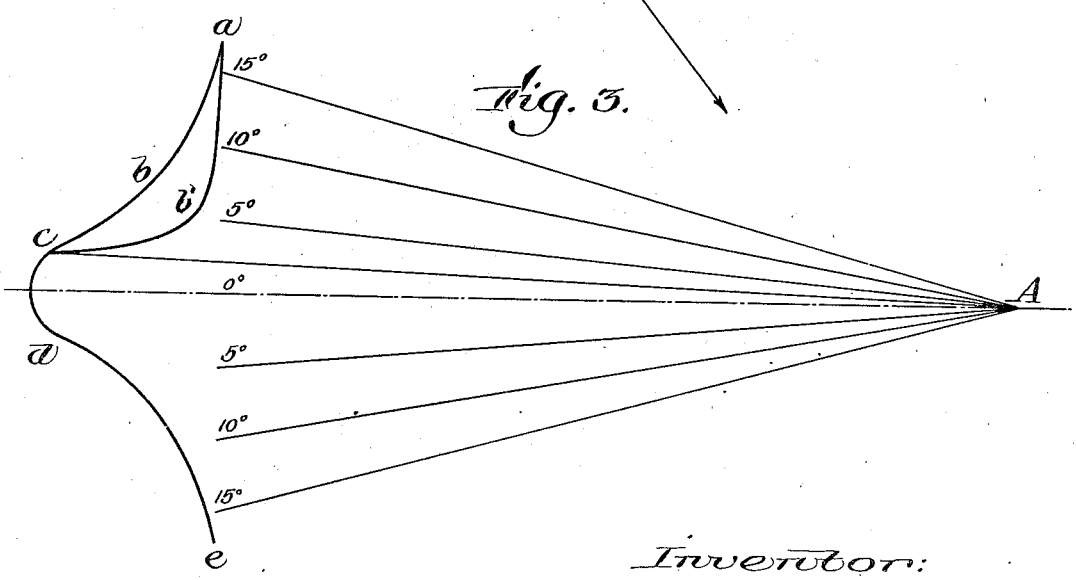
Inventor:
Daniel F. Comstock.
by Roberts, Roberts + Cushman
Attorneys.

UNITED STATES PATENT OFFICE.

DANIEL F. COMSTOCK, OF BROOKLINE, MASSACHUSETTS, ASSIGNOR TO KALMUS, COMSTOCK & WESCOTT, INC., OF BOSTON, MASSACHUSETTS, A CORPORATION OF MASSACHUSETTS.

LIGHT PROJECTION.

1,377,184.

Specification of Letters Patent.    Patented May 10, 1921.

Application filed April 21, 1916. Serial No. 92,750.

*To all whom it may concern:*

Be it known that I, DANIEL F. COMSTOCK, a citizen of the United States, and resident of Brookline, in the county of Norfolk and State of Massachusetts, have invented new and useful Improvements in Light Projections, of which the following is a specification.

This invention relates to light projecting apparatus which has been designed particularly for use as a headlight for vehicles, although it is adapted to be used for many other purposes.

In its broader aspects the invention has to do with an application and utilization of the principle of the critical angle of reflection in a transparent, totally reflecting surface, for distributing or projecting energy into a predetermined zone, while eliminating radiation outside of that zone.

In the more specific application of the invention to automobile headlights, which I will describe as one useful exemplification of the principle of the invention, the apparatus is adapted for preventing dazzling rays of light from being projected above an approximately horizontal plane at about the level of the lamp without the sacrifice of illuminating power in a zone below the horizontal plane.

Two main objects to be attained in designing headlight projectors are, first, to prevent rays of any considerable brightness from being projected upwardly above the level of the lamp or lamps and, secondly, to properly distribute the light within the restricted zone, and in many instances to concentrate as much light as possible just below the horizontal so that the illumination may be effective as far as possible in front of the headlight. The first of these objects could obviously be accomplished by tilting or tipping the headlight downwardly, if this were mechanically feasible, but this expedient would result in a sacrifice of horizontal concentration of light since the intense central rays would then strike the road at a short distance from the headlight and only the weak rays near the edge of the beam would be projected horizontally.

Prior devices have been devised to eliminate the objectionable dazzling effect of headlights by optically bending the rays downwardly, but this expedient, like that of mechanically tilting the beam, results in weak horizontal illumination which is ineffective at any considerable distance from the headlight.

Theoretically the above mentioned desirable results may be accomplished by directing the beam horizontally in the ordinary manner and obstructing all rays above the horizontal plane of the lamp by means of a screen placed a considerable distance in advance of the lamp, but this method is obviously impracticable for the reason that a screen cannot be suitably supported a sufficient distance in front of the lamp.

By my invention the desired results are attained in a practical and efficient manner by directing the beam issuing from a lamp against a reflecting surface, as for example a glass-air surface, which is so constructed and arranged relative to the lamp that certain rays will be reflected and projected into a predetermined limited zone, while light which, if reflected, would be projected outside of the predetermined zone, for example, above a horizontal plane, passes through the reflecting surface by virtue of the fact that all such rays strike the reflecting surface at an angle of incidence less than the critical angle. Other objects of my invention will be hereinafter made apparent.

For convenience, I employ the term critical-angle reflector to designate any reflecting means so constructed and arranged as to refract and transmit, according to the principle of the critical angle of incidence, all or a part of the rays which, if reflected, would be projected in a certain zone.

I have illustrated one embodiment of my invention in the accompanying drawings wherein,—

Figure 1 is a diagrammatic, sectional view illustrating one arrangement of lamp, parabolic reflector and critical-angle reflector;

Fig. 2 is a perspective view of one form of critical-angle reflector; and

Fig. 3 is a diagram showing the general character of the distribution of light from a headlight of the type illustrated in Fig. 1, both with and without the present invention applied thereto.

In the diagrammatic view shown in Fig. 1, A is a source of light located approximately at the focal point of the parabolic reflector B, and C is a prism of glass of suitable properties which affords a critical-angle reflecting surface at its rear face.

If the source of light were a point source and the reflector B, precisely parabolic, all of the reflected rays would be projected parallel to the axis of the reflector, but such conditions are only roughly approximated in the ordinary commercial headlight. As a result, the headlight beam is substantially conical with the relatively great intensity of the central zone rapidly diminishing outwardly as shown by the curve $a, b, c, d, e$ in Fig. 3. Thus the dense portion of the rays from the lamp A, such as X, are reflected by the parabolic reflector in a direction Y, approximately parallel to the axis of the reflector; a part of the rays, such as V, are reflected rearwardly as shown at W; and some of the rays, such as R, are reflected forwardly as indicated at S.

The reflecting prism C is so constructed and positioned relative to the source of light and parabolic reflector that: first, the central rays such as Y will be reflected by the prism C in substantially a horizontal direction; secondly, the rays such as S, which strike the glass-air surface at an angle to the normal greater than the critical angle of incidence, are reflected in a direction below the horizontal depending on their respective angles of incidence; and thirdly, substantially all rays such as W, which strike the glass-air surface at an angle less than the critical angle of incidence, and which, if reflected, would be projected in a direction above the horizontal, pass through the glass-air surface. That is, the reflecting prism C is so constructed and arranged that the angle of incidence of all rays W which, if reflected, would be projected upwardly, is less than the critical angle and substantially all of such rays are not reflected but are refracted. For this purpose I have found that a prism of ordinary glass having a refractive index of 1.5 and a critical angle of 41.7° is suitable.

The upper surface of the prism C is provided with ridges or steps D having faces E and F arranged to minimize the refraction of the rays when entering the prism. The angles between the faces E and F may, if desired, be made such that the average refraction of the direct rays from the lamp and of the rays reflected from the parabolic reflector is a minimum. In view of the fact that the proportion of the direct to the reflected light varies from the axis outwardly, and in view of the fact that the angle of incidence of the direct light varies from the axis outwardly, a still further refinement may be made by making the angle between each pair of faces different so that the objectionable refraction of each face will be a minimum. However, excellent results may be obtained by making the faces E and F parallel, respectively, and the faces E approximately perpendicular to the axis of the parabolic reflector, since most of the reflected rays are substantially parallel to this axis.

As above stated, most of the rays of light issuing from the parabolic reflector are substantially parallel to the axis of the reflector and furthermore the most intense light issuing directly from the lamp will be in this direction. I preferably so position the headlight and the critical-angle reflector relative to each other and to the horizontal that the ray A—C in Fig. 3, which strikes the reflector at the critical angle, is reflected horizontally or slightly therebelow. Substantially all the light which, if reflected, would be projected above the horizontal, is transmitted through the reflector as shown by the curve $a, b', c$. Thus, the more intense central light $c, d$, in Fig. 3 will be reflected as at M, in Fig. 1, in or slightly below a horizontal direction and thus afford a concentrated beam which will be projected far in advance of the automobile or other vehicle when thus employed. The comparatively small amount of light which strikes the glass-air surface at an angle of incidence greater than the critical, as at O, will be projected on the roadway nearer to the vehicle where less light is ordinarily needed, and substantially all of the light striking the glass-air surface at an angle of incidence less than the critical angle, as at N, (which is also a comparatively small amount of the total light) will be refracted. This refracted light is not wasted but is projected forwardly in the direction Q and illuminates the surface immediately in front of the projector. Owing to the well known fact that light suddenly ceases to be reflected at the critical angle, the horizontal plane of discontinuity is rendered sharp and distinct.

While I have herein shown and described one form of my invention for illustrative purposes, and have disclosed and discussed in detail the construction and arrangement incidental to one specific embodiment thereof, it is to be understood that the invention is limited neither to the details nor the precise relative arrangement of parts, nor to its specific application herein shown, but that extensive deviations from the illustrated form or embodiment of the invention may be made without departing from the principles thereof.

For example, the glass-air surface may be curved or shaped in any desired manner to get a particular distribution of light. Furthermore, the invention is not limited to use on automobiles, cars, locomotives, etc., but may be otherwise employed as, for example, to restrict light from a search light or other source in any desired manner. Moreover, the invention is applicable to invisible rays such as X-rays, ultra-violet or actinic rays, infra-red or heat rays, electromagnetic or Hertzian waves, and indeed all wave radiations which display the phenomena of reflection and refraction.

What I claim is:

1. Projection apparatus comprising means for producing a concentrated beam of light having substantially parallel rays and having rays which are not parallel with said rays, a transparent reflector obliquely disposed in the path of the beam of light at such an angle that the parallel rays make substantially critical angles of incidence with the reflector so that a part of one class of rays is transmitted and a part of the other class of rays is reflected, the parallel rays being so separated from the non-parallel rays as to produce a beam sharply defined on at least one side.

2. Projection apparatus comprising means for producing a concentrated beam of light having substantially parallel rays, a transparent reflector obliquely disposed in the path of the beam of light at such an angle that the parallel rays are incident to the reflector at substantially the critical angle so that all rays making greater angles of incidence with the reflector are reflected and all rays making lesser angles of incidence with the reflector are transmitted through the reflector, whereby a beam of light sharply defined on one side is reflected from the reflector.

3. Projection apparatus comprising a source of radiant energy and a critical-angle reflector arranged to reflect and project rays in a predetermined zone, and to transmit rays which, if reflected, would be projected outside of said predetermined zone.

4. Projection apparatus comprising a source of wave radiation and reflecting-refracting means having a critical angle of incidence, the said means being so disposed in the path of said radiation that a portion of said energy is reflected and restricted to a zone bounded on one side by a plane making an angle with a normal to said means substantially equal to the critical angle.

5. Projection apparatus comprising means for producing a beam of radiant energy, and a critical-angle reflector in the path of the beam from said source arranged to reflect part of said beam in a predetermined zone, and to transmit only that part of said beam which, if reflected, would fall outside of said zone.

6. Light projecting apparatus comprising means for producing a beam of light, means for reflecting a portion of said light, said reflecting means refracting and transmitting all rays incident thereto within the critical angle, whereby a sharply defined zone of reflected light is produced.

7. A headlight comprising means for producing a beam of light, and means for reflecting a portion of said beam in a zone below a substantially horizontal plane, said reflecting means permitting all light to pass therethrough which, if reflected, would be projected above said plane.

8. A headlight comprising means for producing a beam of light downwardly, a prism in the path of said beam, means on the upper surface of said prism to minimize refraction, and a total reflecting surface on the lower side of said prism, whereby concentrated light is reflected in a zone below a substantially horizontal plane and whereby that portion of the beam which, if reflected, would be projected upwardly, is transmitted and refracted downwardly and forwardly.

9. The method of producing a beam of light sharply defined on one side comprising producing a beam of light having substantially parallel rays and having some rays which are not parallel with said rays, and projecting the beam to a transparent reflector so that the parallel rays are incident to the reflector at substantially the critical angle, whereby the rays incident to the reflector at less than the critical angle are transmitted and the rays incident to the reflector at more than the critical angle are reflected.

10. The method of producing a beam of light sharply defined on one side comprising producing a beam of light having substantially parallel rays and having some rays which are not parallel with said rays, and projecting the beam to a reflector at such an angle that the parallel rays are incident thereto at the critical angle, whereby the non-parallel rays deviating in one direction from the parallel rays are transmitted and the other rays are reflected in the form of a beam sharply defined on one side.

Signed by me at Boston, Massachusetts, this 17th day of April, 1916.

DANIEL F. COMSTOCK.